United States Patent [19]
Kelmar

[11] 3,861,367
[45] Jan. 21, 1975

[54] NON-POLLUTING INTERNAL COMBUSTION ENGINE SYSTEM

[76] Inventor: John J. Kelmar, 2205 Cypress Dr., McKeesport, Pa. 15131

[22] Filed: July 24, 1974

[21] Appl. No.: 491,239

Related U.S. Application Data

[63] Continuation-in-part of Ser. No. 243,746, April 13, 1972, abandoned.

[52] U.S. Cl............ 123/119 A, 123/1 A, 123/41.2, 123/41.22, 60/278
[51] Int. Cl........................................... F02m 25/06
[58] Field of Search........ 123/119 A, 119 E, 3, 1 A, 123/41.2, 41.22, 41.23; 60/278, 279

[56] References Cited
UNITED STATES PATENTS

| | | | |
|---|---|---|---|
| 2,187,074 | 1/1940 | Caproni | 123/119 A |
| 2,715,395 | 8/1955 | Finvold | 123/119 A |
| 3,559,402 | 2/1971 | Stone et al. | 60/279 |
| 3,709,203 | 1/1973 | Cettin et al. | 123/119 A |

Primary Examiner—Wendell E. Burns
Attorney, Agent, or Firm—Brown, Murray, Flick & Peckham

[57] ABSTRACT

An internal combustion engine system is provided with a liquid oxygen tank and means for gasifying liquid oxygen leaving the tank and for conducting the gas to the inlet ports of the engine cylinders. A predetermined percentage of exhaust gases from the cylinders is conducted back to mix with the oxygen gas before it reaches the cylinders. Fuel from a tank iss delivered to said mixture. The system does not have any air intake but relies on oxygen from the liquid oxygen tank as the oxidizer for the fuel, thereby avoiding production of carbon monoxide, nitrous oxide and other noxious exhaust gases.

5 Claims, 3 Drawing Figures

NON-POLLUTING INTERNAL COMBUSTION ENGINE SYSTEM

This application is a continuation-in-part of my pending patent application, Ser. No. 243,746, filed Apr. 13, 1972 now abandoned.

Internal combustion engines, whether of the Otto or diesel type, are powered by the combustion of a mixture of hydrocarbon fuel and an oxidizer. The current practice is to use air as the oxidizer. After the oxygen in the air is burned out, the exhaust emmission is a gaseous mixture containing CO, $CO_2$, NO, $NO_2$, $N_2$ $SO_2$, $H_2$, $O_2$, $H_2O$, hydrocarbons and particulate matter (aerosols). The exhaust gas cannot be freed of these contaminants and air polluters, except for the hydrocarbons and particulate matter, which amount to less than 1% of the total pollutants produced by the engine.

Furthermore, the internal combustion engine is a chemical heat engine consuming about 15 to 20 pounds of air per pound of fuel consumed. The burning of the fuel raises the temperature to about 4,500° F for a short time, but when the engine is mounted in a vehicle, only about 10% of the heat energy normally is used to drive the vehicle. Approximately 10% is lost in friction, 40% is lost in cooling and 40% is lost in exhaust.

It has been proposed to mix oxygen, air and water with fuel as a booster in driving an automobile engine, but this does not solve the pollution problem nor does it improve the efficiency of the engine.

In accordance with this invention, internal combustion engines are prevented from polluting the atmosphere by using pure oxygen rather than air as the oxidizer for the fuel. This also results in partially reclaiming the energy lost in present day engine exhaust, because some of the exhaust, which is a mixture of water vapor and carbon dioxide, is recycled and replaces nitrogen as the temperature control medium for combustion. At the high temperature reached in the combustion process the recycled $H_2O$ and $CO_2$ break down or dissociate into CO, $O_2$ and $H_2$. The amount of this dissociation, at the explosion temperature of about 5,000° F with pure oxygen, can be considerable. This dissociation, about 7% $H_2O$ and 33% $CO_2$, reduces the temperature. As the temperature falls below the dissociation temperature, the dissociated CO and $H_2$ burn with oxygen and release energy and $CO_2$ and $H_2O$, which are the products of completed reactions.

It is among the objects of this invention to provide internal combustion engines which will not pollute the atmosphere, which are more efficient than heretofore, which are suitable for driving vehicles, which eliminate the need for air conditioner compressors, and which recycle about 40% of the exhaust gases.

The invention is illustrated in the accompanying drawings, in which

Figure 1:
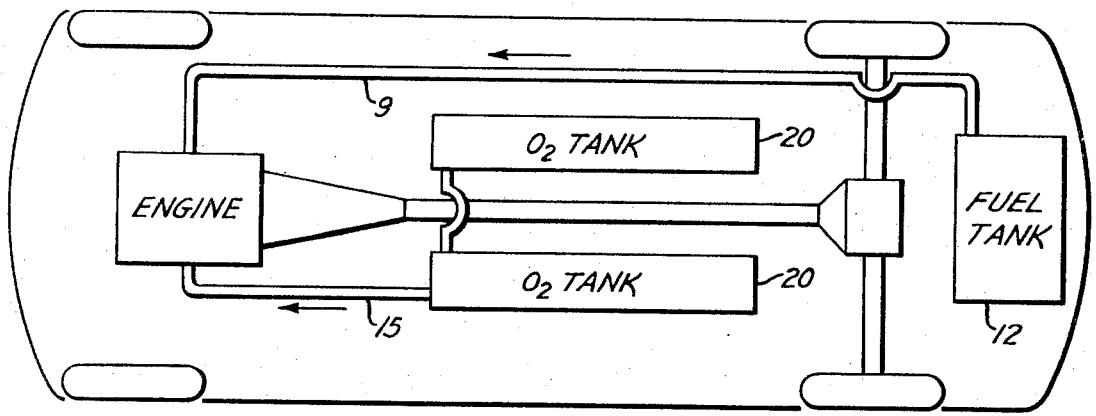
FIG. 1 is a diagram of an automobile chassis.
Figure 2:
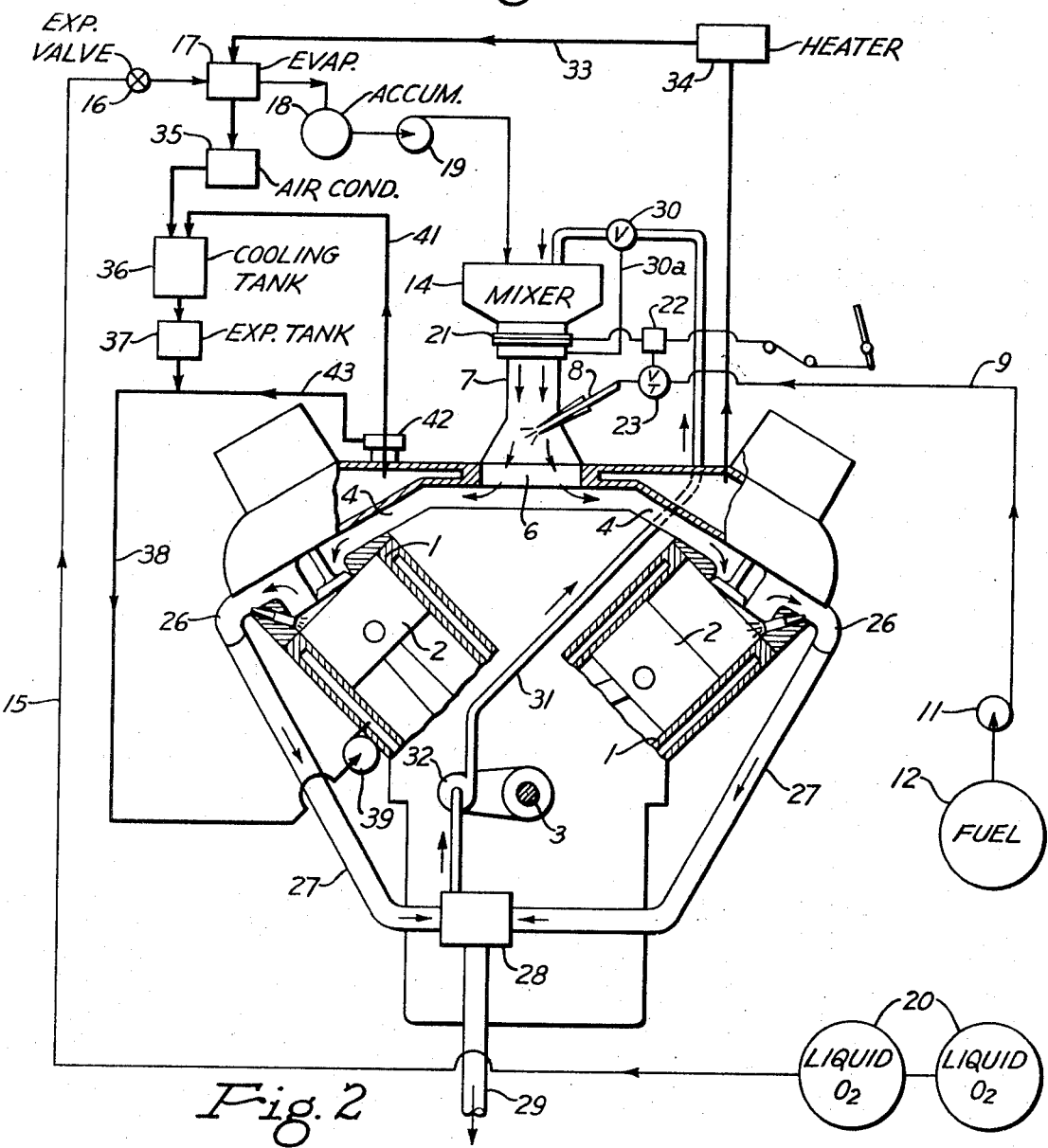
FIG. 2 is a cross section and diagrammatic view of my system used with an Otto engine.

Referring to FIG. 2 of the drawings, which shows an Otto type internal combustion engine, there are the usual cylinders 1 containing pistons 2 that drive a crank shaft 3. The usual inlet ports at the upper ends of the cylinders are connected by conduits 4 to an inlet manifold 6 that receives an explosive gaseous mixture from a carburetion chamber 7, into which fuel is injected from a nozzle 8 connected by a fuel line 9 to a pump 11 that receives fuel, such as gasoline, from a fuel tank 12.

It is a feature of this invention that inlet of the carburetion chamber is connected with the outlet of a mixing chamber 14 that is not open to the atmosphere but that receives oxygen from one or more insulated liquid oxygen tanks 20. The liquid oxygen flows through an insulated pipe 15 and through an expansion valve 16 and a heat exchanger or evaporator 17 where it is converted into gas that flows into a tank or accumulator 18, from which it is pumped by a pump 19 into the mixing chamber 14. Between the mixing chamber and the carburetion chamber below it there is a known metering valve 21 of the venturi type that is linked through a throttle control 22 with a control valve 23 in the injector nozzle line 9 so that both valves can be operated simultaneously. The manner in which heat exchanger 17 is heated will be described later.

The exhaust ports of the cylinders open into the exhaust manifolds 26 connected by pipes 27 to a collecting chamber 28 that has an outlet connected by an exhaust pipe 29 to the usual muffler (not shown). This collecting chamber also has a second outlet connected by a pipe 31, in which there is an adjustable metering valve 30, to mixing chamber 14. A small pump 32 is provided that is operated from the crank shaft for pumping some of the exhaust gas back through pipe 31 to the mixing chamber. Since there are two pipes 27 delivering exhaust gas to collecting chamber 28 and only one pipe 29 connecting that chamber with the atmosphere, escape of exhaust gas from the chamber is restricted by pipe 29, so part of the gas is fed to the pump and flows through pipe 31 to mixing chamber 14. On its way, this recycled exhaust gas flows through metering valve 30, the passage through which is controlled through a linkage 30a from valve 21 in known manner to meter a predetermined percentage of the exhaust gas to mixing chamber 14. An amount equal to about 40% of the total exhaust gas is preferred because it provides a mixture of gases in the mixing chamber that is thermally equivalent to air, as mentioned later herein.

When the accelerator is depressed, the throttle control 22 opens valves 21 and 23 wider and that causes metering valve 30 to open wider also. The gases from chamber 14 flow through the carburetor and are drawn into the engine by the suction caused by the stroke of the engine pistons. Although the volume of exhaust gas recycled at this time is greater than before, the recycled percentage of total exhaust gas remains about the same.

Because this system operates with pure oxygen instead of air, the exhaust gas consists of $CO_2$ and $H_2O$ that dilute the oxygen from the tanks and reduce the combustion temperature. Since the exhaust gas also breaks down into carbon, oxygen and hydrogen which serve as fuel, part of the energy in the exhaust is recovered. Oxygen alone is extremely active and it generates very high temperatures in the absence of nitrogen. Consequently, it is diluted to a mixture of 60% oxygen and 40% recycled $CO_2$ and $H_2O$. This ratio gives a mixture thermally equivalent to air, which is why it is preferred to recycle about 40% of the exhaust gas.

Since air is not used in the combustion of the fuel, the pollutants, mainly NO and $NO_2$, that are due to the use of air are not produced. Also, by using oxygen instead of air, complete combustion is effected and therefore the production of carbon monoxide is avoided. The exhaust gas consists of carbon dioxide and water vapor.

The heat exchanger 17 for gasifying the liquid oxygen is heated by hot water delivered to it through a pipe 33 at about 180° F after flowing from the engine cooling water jacket and through the heater 34 for the vehicle. Of course, this water is chilled in the heat exchanger to about 65° F by the cold oxygen gas from the expansion of liquid oxygen at the expansion valve. The chilled water is led through the vehicle air conditioner 35, where it is warmed again, to a cooling tank 36, the outlet of which is connected through an expansion tank 37 and a line 38 to a water pump 39 that circulates the water through the engine and the various elements just mentioned. The cooling tank 36 has a second inlet for hot water from a pipe 41 that leaves the engine cooling system through a thermostat 42. This hot water mixes in the cooling tank with the chilled water from the air conditioner and lowers the temperature of the hot water so that it is not too hot when it is pumped back into the engine. The cooling tank replaces the usual radiator. The thermostat is also connected by a pipe 43 to line 38 that leads to the water pump 39.

For starting a cold engine, the coolant leaving the engine is compelled by thermostat 42 to flow through by-pass pipe 43 directly to the water pump 39 until normal operating temperature of the water is reached. There will be enough oxygen gas in accumulator 18 to operate the engine during the warm-up period, and even though the water flowing through heat exchanger 17 is cold it will be so much warmer than the liquid oxygen that some of the latter will be gasified.

Figure 3:
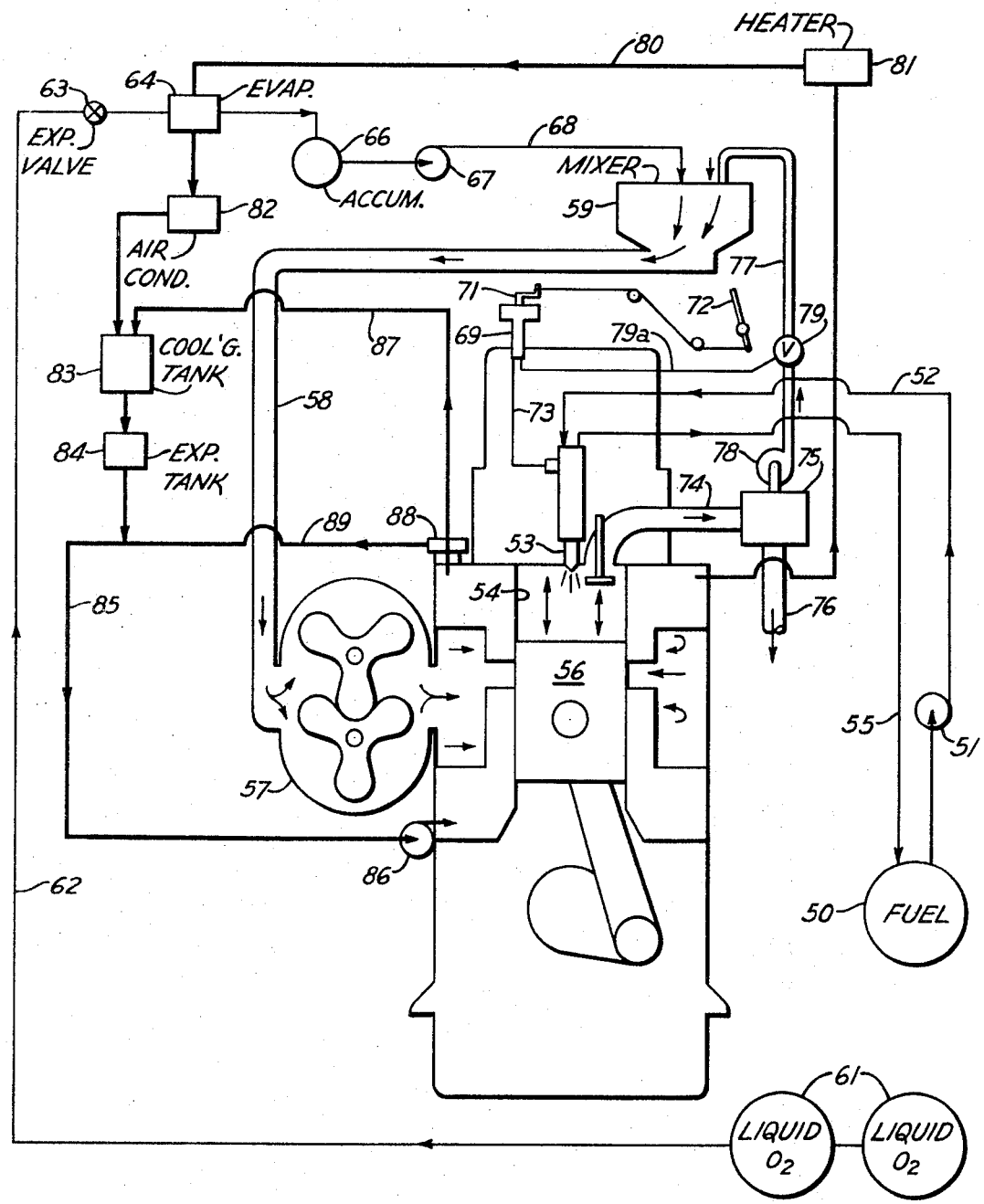
FIG. 3 is a view, similar to FIG. 2, of the system used with a diesel engine.

The way this system, with certain modifications, is used with a diesel engine is illustrated in FIG. 3. Fuel from a tank 50 is forced by a pump 51 through a line 52 connected to an injector 53 projecting into each cylinder 54 of the engine. Unused fuel for the injector returns through a restricted line 55 to the fuel tank. The piston 56, instead of compressing air in the cylinder, compresses pure oxygen, diluted with $CO_2$ and $H_2O$ as will be explained, that is delivered to the cylinder by a blower 57 having its inlet connected by a pipe 58 to the outlet of a mixing chamber 59. The blower is operated in the same way as in conventional diesel powered vehicles. The oxygen comes from liquid oxygen tanks 61 that are connected by an insulated pipe 62 to an expansion valve 63 and a heat exchanger or evaporator 64, where it is converted into gas. The gas flows into a tank or accumulator 66, from which a pump 67 pumps it through a line 68 into the mixing chamber. There is a governor 69 that has a throttle control 71, operated by the usual accelerator pedal 72. The governor is linked by a rod 73 to the injector 53, which is a known type provided with slide valves for injecting the correct amount of fuel into the cylinder. The governor is driven in known manner from the crankshaft. When the accelerator pedal is moved to obtain any desired speed, it adjusts governor control 71, which in turn causes the governor to change the fuel setting in all of the injectors so that the fuel will be metered the correct amount for handling the load.

The exhaust port of each cylinder is connected by a pipe 74 to a collecting chamber 75 that has an outlet connected by an exhaust pipe 76 to the usual muffler. This chamber also has a second outlet connected by a pipe 77, containing a metering valve 79, to mixing chamber 59. Mounted in the pipe is a blower 78 capable of delivering about 40% of the exhaust gas, made up of $CO_2$ and $H_2O$, to the mixing chamber. This is done, as in the first embodiment, through the help of the metering valve 79, the size of the gas passage of which is controlled through a linkage 79a from the governor as it controls the injectors, whereby a substantially constant percentage of exhaust gas is recycled.

It will therefore be seen that this system, like the one previously described, operates with pure oxygen instead of air, and that it utilizes an appreciable amount of the exhaust gas for diluting the oxygen from the tanks and reducing the combustion temperature. Likewise, part of the energy in the exhaust gas is recovered.

The heat exchanger 64 is heated by hot water delivered to it through a pipe 80 after flowing out of the water jacket of the engine and through the vehicle heater 81. In the heat exchanger this water is chilled to about 65° F by the cold oxygen and is passed through the vehicle air conditioner 82, where it is warmed again before reaching a cooling tank 83. The outlet of this tank is connected through an expansion tank 84 and a line 85 to a water pump 86 that circulates the water through the engine and the system. The cooling tank 83 has a second inlet for hot water from a pipe 87 connected to a thermostat 88 mounted on the engine. This water mixes in the cooling tank with the chilled water from the air conditioner and lowers the temperature of the hot water, thereby replacing the usual radiator. The thermostat is also connected by a pipe 89 to line 85. The thermostat aids in starting the engine when it is cold, because it causes the water from the cooling jacket to flow directly back to the water pump until it is warm enough for the thermostat to direct the water to the cooling tank through line 87.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In an internal combustion engine system provided with a water jacket and with cylinders having inlet and exhaust ports and containing pistons, a liquid oxygen tank, a heat exchanger for receiving liquid oxygen from the tank, means for delivering some of the hot water from the engine water jacket to the heat exchanger for gasifying liquid oxygen therein and cooling the water, conduit means for conducting the gaseous oxygen to said inlet ports, means for conducting a predetermined percentage of exhaust gases from said exhaust ports back to said conduit means to mix with oxygen therein, a fuel supply tank, a fuel line connected to the fuel tank for delivering fuel to said mixture to form a combustible mixture, a cooling tank, means for conducting water cooled in the heat exchanger to the cooling tank, means for delivering the rest of the hot water from the engine water jacket to said cooling tank for cooling therein, and means for returning water from the cooling tank to said water jacket, said system lacking an air intake.

2. In an internal combustion engine system according to claim 1, said exhaust gas conducting means being designed to conduct approximately 40% of the exhaust gases leaving said exhaust ports.

3. In an internal combustion engine system according to claim 1, said conduit means including a mixing chamber for receiving said exhaust gases, and said system including a throttle valve downstream from said chamber, means for injecting fuel from said fuel line into said conduit means downstream from said valve, a throttle valve in said fuel line, and means connecting said valves for operating them in unison, said exhaust gas conducting means including a conduit connected with said conduit means, a pump for pumping exhaust gases through said conduit, and a metering valve in said conduit.

4. In an internal combustion engine system according to claim 1, said engine system being a diesel system in which said cylinders are provided with fuel injectors and said fuel line is connected to the injectors, said exhaust gas conducting means including a conduit connected with said conduit means, means for directing gases into said conduit, and a metering valve in said conduit.

5. In an internal combustion engine system according to claim 1, said means for delivering the rest of the hot water to the cooling tank including a pipe and thermostat means, and the engine system also including a by-pass conduit connecting the thermostat means to said water-returning means, said thermostat means normally closing said pipe but connecting the engine water jacket with said by-pass conduit for flow of water therethrough directly to said water-returning means until that water reaches a predetermined temperature and then closing the by-pass conduit and connecting the water jacket with said pipe.

* * * * *